Feb. 6, 1940.  H. LINDSAY  2,189,011

HOOK ADAPTER FOR BOLTS

Filed Sept. 6, 1938

Inventor:
Henry Lindsay
by Cushman Darby Cushman
attys.

Patented Feb. 6, 1940

2,189,011

UNITED STATES PATENT OFFICE 2,189,011

HOOK ADAPTER FOR BOLTS

Henry Lindsay, Bradford, England, assignor to Henry Lindsay Limited, Bradford, England Application September 6, 1938, Serial No. 228,697
In Great Britain April 30, 1938

2 Claims. (Cl. 189—35)

This invention relates to adapters for converting ordinary standard or straight bolts into hook bolts, said adapters being of the kind comprising a thick metal washer having a rectangular hole to take bolts with round or square necks and being formed on one side with a laterally projecting abutment equivalent to the hook portion of a forged hook bolt.

With this construction, when an adapter is being used to clamp on to flanges of joists with the bolt lying parallel with the base or back of the flange, it has been found that there is apt to be slackness between the bolt and the flat surface of the base or back of flange due to the hook portion of the adapter not necessarily being a close fit upon the edge of the joist flange. In order to overcome this disadvantage it is necessary to supply a size of hook adapter to fit exactly the flange for which it is intended and consequently in order to cover an extensive range of flanges large numbers of hook adapters must be supplied, and the chief object of this invention is to provide a hook adapter which will be suitable for a large range of flanges.

According to the invention the laterally projecting abutment of the adapter is provided with a web or fillet adapted to bear against the edge of the flange upon which the adapter is used, the web or fillet being such that the adapter can be used for a wide range of flange thicknesses.

In order that the invention may be clearly understood and readily carried into effect, the same will now be more fully described with reference to and by the aid of the accompanying drawing, wherein—

Figure 1:
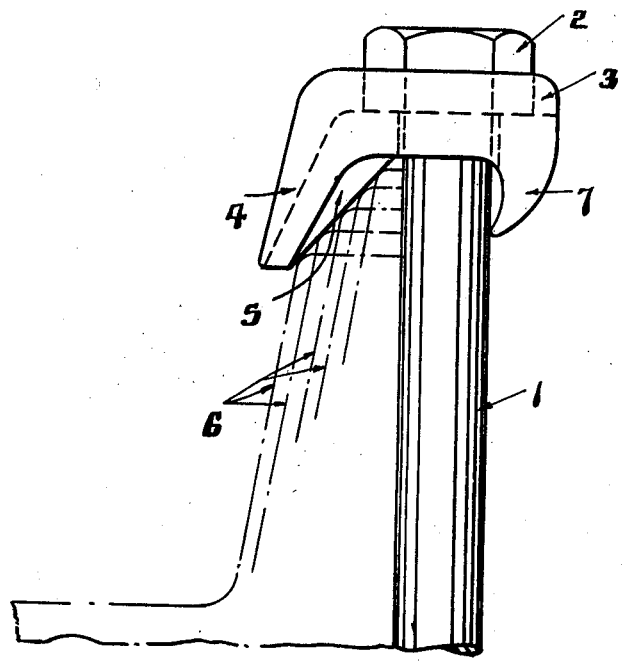
Figure 1 is a side elevation of an adapter constructed according to the invention.
Figure 2:
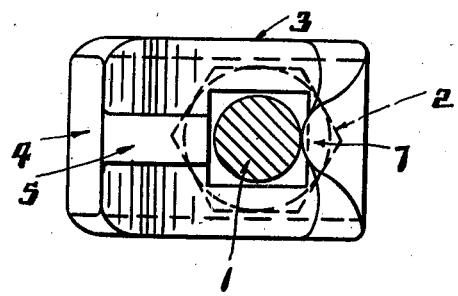
Figure 2 is an inverted plan of Figure 1.

Referring to the drawing, a bolt 1 having a hexagonal head 2 is passed through an adapter or clamp 3 which is formed with a depending hook portion 4. Said hook portion 4 is provided with a fillet or web 5 on its underside which is adapted to engage the flange 6 of a joist or the like. The fillet or web 5 is so formed that varying sizes of flanges 6 may be held by it, as indicated by the dotted lines in Figure 1. A depending spur 7 is formed opposite to the hook portion or abutment 4 and is adapted to bear against the bolt 1. If desired, said fillet or web 5 may be made of such a size and material that it may be readily filed or cut away so that the flange 6 of the joist may be more securely held by the adapter 3.

It will be seen that when the hook adapter is applied, the clamp 3 is disposed to one side of the flange 6 so that the abutment 4 overlaps the flange and the web or fillet 5 bears firmly against the inclined edge of the flange, irrespective of the thickness of the flange, and that the spur 7 contacts with the bolt, thus providing positive means for securing the hook adapter to the flange and for preventing the development of slack between the bolt 1 and the flange.

I claim:

1. In combination with a member having a flange, a hook adapter arranged to be secured to the edge of said flange, said adapter including a clamp having an opening adjacent the base of the flange, a bolt disposed substantially parallel to the base of the flange and extending through said opening for securing the clamp to the flange, said adapter having a lateral projecting abutment on one side overlapping said flange and a spur on the side opposite to said abutment engaging said bolt, and said abutment having a medially disposed web projecting from the underside thereof, said web extending substantially perpendicular to the edge of the flange so as to bear against the same when the parts are applied, said web being the only part of the hook adapter bearing against the flange.

2. In combination with a member having a flange provided with an inclined edge, a hook adapter arranged to be secured to the edge of said flange, said adapter including a clamp having an opening adjacent the base of the flange, a bolt disposed substantially parallel to the base of the flange and extending through said opening for securing the clamp to the flange, said adapter having a lateral projecting abutment on one side overlapping said flange and a spur on the side opposite to said abutment engaging said bolt, and said abutment having an inclined web projecting from the underside thereof arranged to bear against the edge of the flange to insure a tight fit of the clamp with the flange, irrespective of the thickness of the latter, when the parts are set up, said web being the only part of the hook adapter bearing against the flange.

HENRY LINDSAY.